(12) United States Patent
Schiocchet et al.

(10) Patent No.: US 11,910,469 B2
(45) Date of Patent: Feb. 20, 2024

(54) EARLY CONNECTED DISCONTINUOUS RECEPTION

(71) Applicant: QUALCOMM Incorporated, San Diego, CA (US)

(72) Inventors: Marcelo Schiocchet, San Diego, CA (US); Amrit Kharel, San Diego, CA (US); Kausik Ray Chaudhuri, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 17/452,282

(22) Filed: Oct. 26, 2021

(65) Prior Publication Data

US 2023/0126623 A1    Apr. 27, 2023

(51) Int. Cl.
*H04W 76/28* (2018.01)
*H04W 72/0446* (2023.01)

(52) U.S. Cl.
CPC ....... *H04W 76/28* (2018.02); *H04W 72/0446* (2013.01)

(58) Field of Classification Search
CPC .......................... H04W 76/28; H04W 72/0446
USPC .......................................................... 370/311
See application file for complete search history.

(56) References Cited

U.S. PATENT DOCUMENTS

2014/0099955 A1*  4/2014  Nukala ............. H04W 36/0079
                                                                     455/436
2023/0189291 A1*  6/2023  Jiang ..................... H04L 1/1851
                                                                     370/329

* cited by examiner

*Primary Examiner* — Intekhaab A Siddiquee
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration for connected discontinuous reception (CDRX), the configuration indicating a first condition associated with a first CDRX parameter and a second condition associated with a second CDRX parameter. The UE may transition to a CDRX cycle when the first condition and the second condition are satisfied prior to an expiration of a CDRX inactivity timer. Numerous other aspects are described.

30 Claims, 6 Drawing Sheets

500

510 — Receive a configuration for connected discontinuous reception (CDRX), the configuration indicating a first condition associated with a first CDRX parameter and a second condition associated with a second CDRX parameter 520 — Transition to a CDRX cycle when the first condition and the second condition are satisfied prior to an expiration of a CDRX inactivity timer

EARLY CONNECTED DISCONTINUOUS RECEPTION

FIELD OF THE DISCLOSURE

Aspects of the present disclosure generally relate to wireless communication and to techniques and apparatuses for early connected discontinuous reception (CDRX).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive a configuration for connected discontinuous reception (CDRX), the configuration indicating a first condition associated with a first CDRX parameter and a second condition associated with a second CDRX parameter. The one or more processors may be configured to transition to a CDRX cycle when the first condition and the second condition are satisfied prior to an expiration of a CDRX inactivity timer.

Some aspects described herein relate to a method of wireless communication performed by a UE. The method may include receiving a configuration for CDRX, the configuration indicating a first condition associated with a first CDRX parameter and a second condition associated with a second CDRX parameter. The method may include transitioning to a CDRX cycle when the first condition and the second condition are satisfied prior to an expiration of a CDRX inactivity timer.

Some aspects described herein relate to a non-transitory computer-readable medium that stores a set of instructions for wireless communication by a UE. The set of instructions, when executed by one or more processors of the UE, may cause the UE to receive a configuration for CDRX, the configuration indicating a first condition associated with a first CDRX parameter and a second condition associated with a second CDRX parameter. The set of instructions, when executed by one or more processors of the UE, may cause the UE to transition to a CDRX cycle when the first condition and the second condition are satisfied prior to an expiration of a CDRX inactivity timer.

Some aspects described herein relate to an apparatus for wireless communication. The apparatus may include means for receiving a configuration for CDRX, the configuration indicating a first condition associated with a first CDRX parameter and a second condition associated with a second CDRX parameter. The apparatus may include means for transitioning to a CDRX cycle when the first condition and the second condition are satisfied prior to an expiration of a CDRX inactivity timer.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
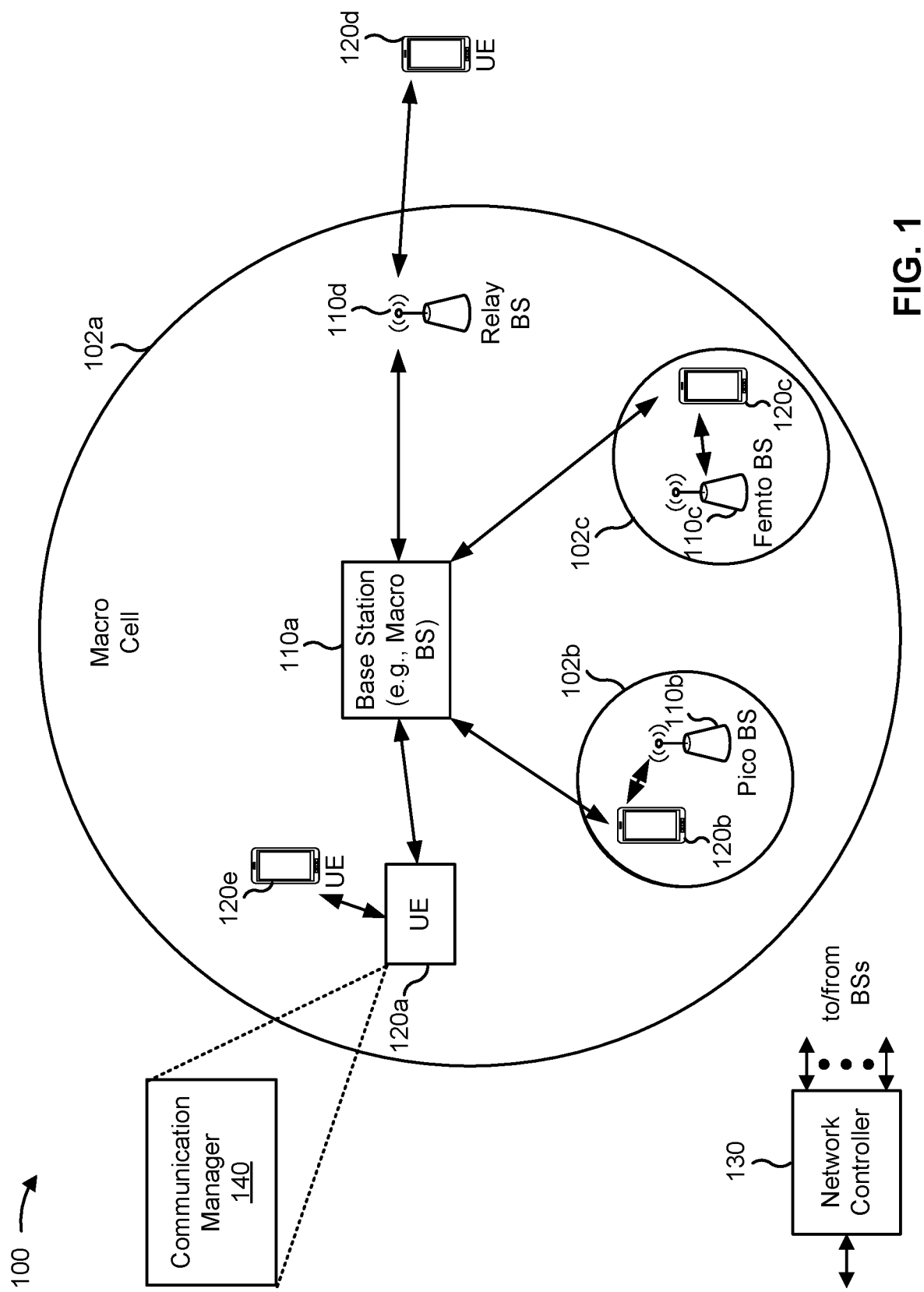
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown)

in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with early connected discontinuous reception (CDRX). Additionally, or alternatively, the communication manager 140 may perform one or more other operations described herein.

As indicated above, FIG. 1 is provided as an example. Other examples may differ from what is described with regard to FIG. 1.

Figure 2:
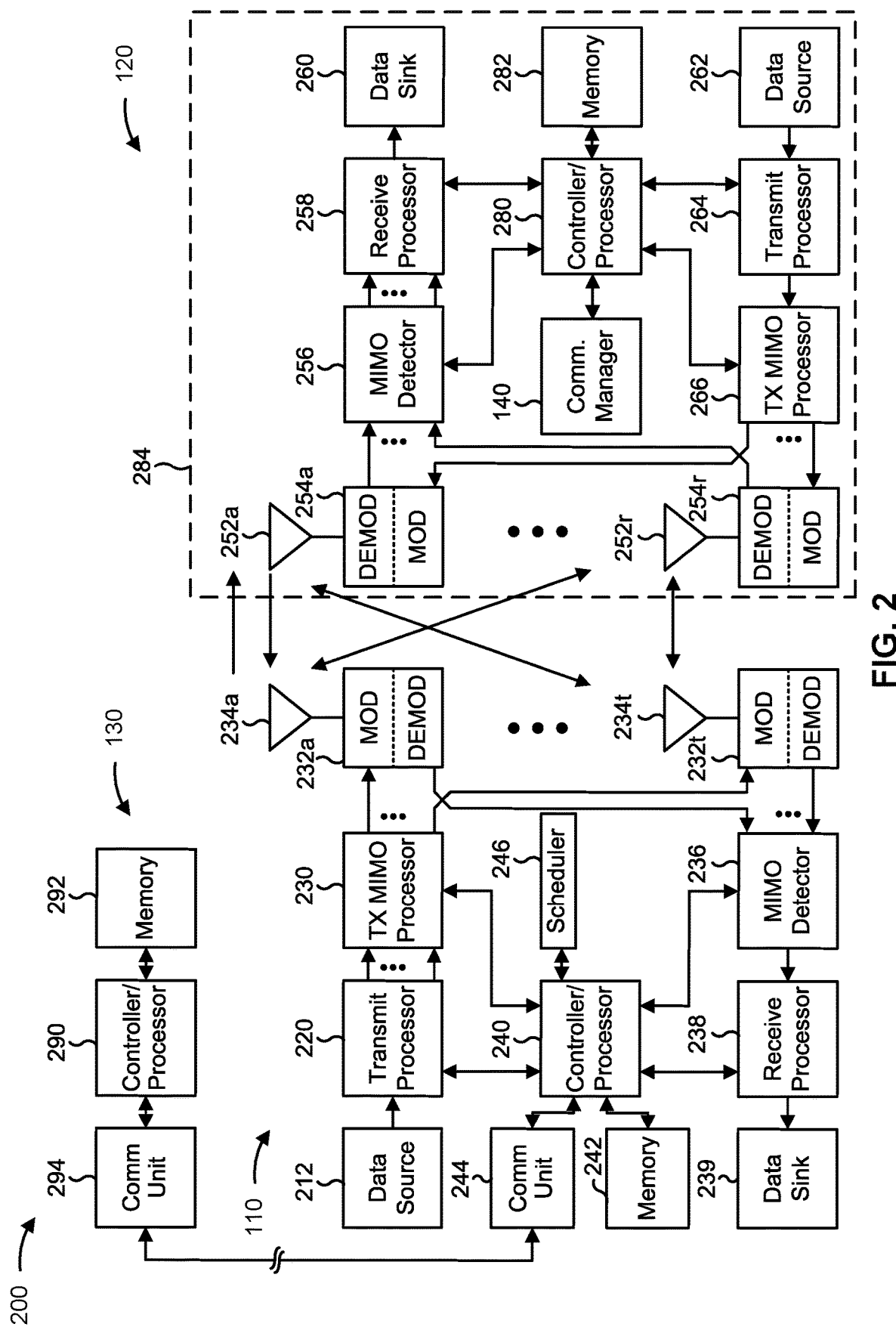
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the base station 110, the controller/processor 280 of the UE 120, and/or any other component(s) of FIG. 2 may perform one or more techniques associated with early CDRX, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, and/or other processes as described herein. In some examples, executing instructions may include running the instructions, converting the instructions, compiling the instructions, and/or interpreting the instructions, among other examples.

In some aspects, the UE includes means for receiving a configuration for CDRX, the configuration indicating a first condition associated with a first CDRX parameter and a second condition associated with a second CDRX parameter; and/or means for transitioning to a CDRX cycle when the first condition and the second condition are satisfied prior to an expiration of a CDRX inactivity timer. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
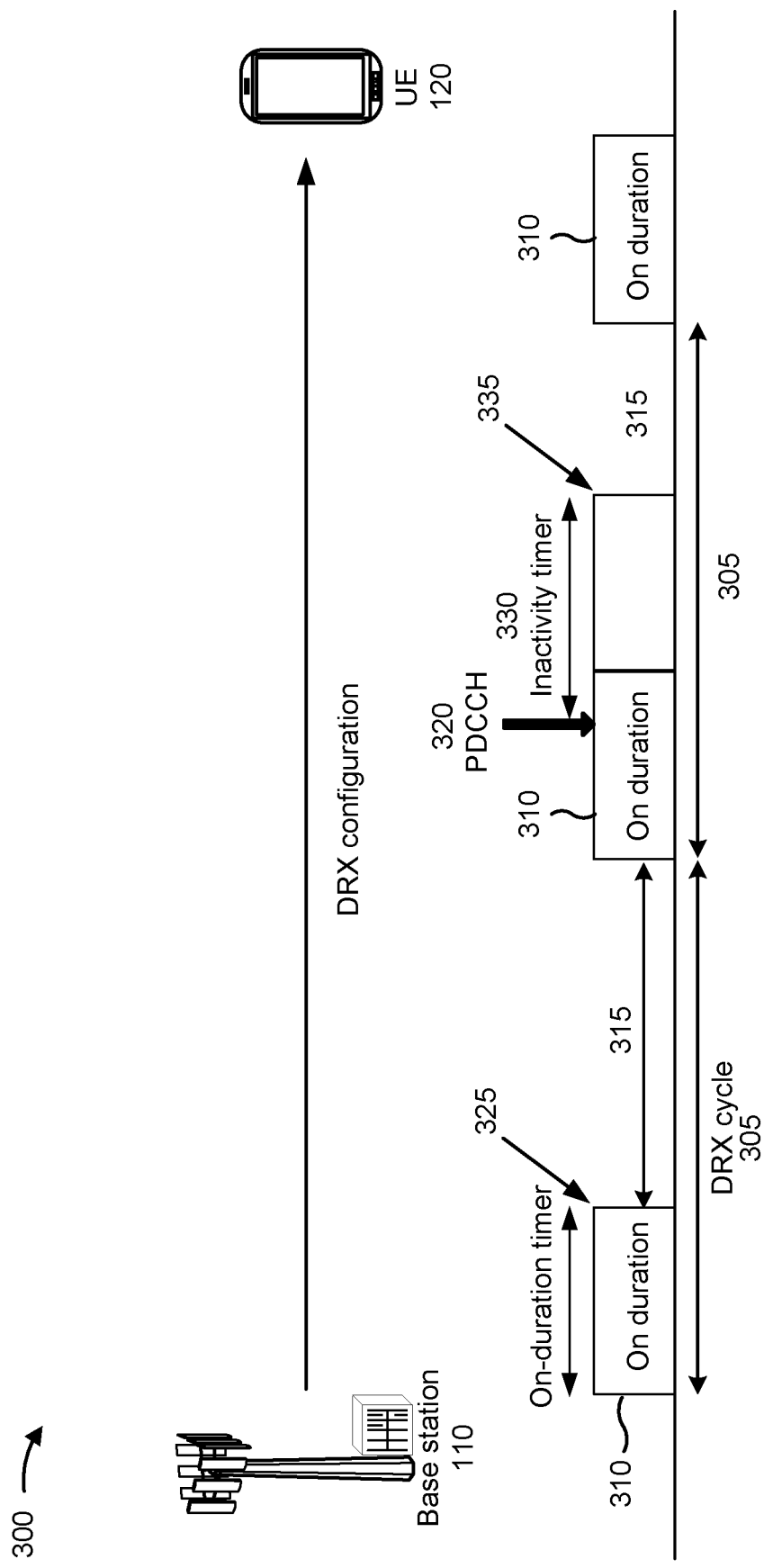
FIG. 3 is a diagram illustrating an example of discontinuous reception (DRX), in accordance with the present disclosure.

FIG. 3 is a diagram illustrating an example 300 of a discontinuous reception (DRX) configuration, in accordance with the present disclosure. In general, DRX can be used by a UE 120 operating in a radio resource control (RRC) idle mode when monitoring for paging messages. DRX avoids the UE 120 having to monitor all physical downlink control channel (PDCCH) transmission opportunities and, therefore, helps conserve battery power. DRX can also be used by a UE 120 operating in an RRC connected mode to help conserve battery power. Connected mode DRX (CDRX) takes advantage of periods of inactivity by allowing the UE 120 to enter a sleep state during which the UE 120 is not required to monitor the PDCCH. Typically, the UE 120 periodically wakes up to monitor the PDCCH in case there is a requirement to receive a downlink resource allocation. The UE 120 is permitted to interrupt the sleep state to send a scheduling request (SR) and in association with initiating an uplink transmission.

As shown in FIG. 3, a base station 110 may transmit a DRX configuration to a UE 120 to configure a DRX cycle 305 for the UE 120. A DRX cycle 305 may include a DRX on duration 310 (e.g., during which a UE 120 is awake or in an active state) and an opportunity to enter a DRX sleep state 315. As used herein, the time during which the UE 120 is configured to be in an active state during the DRX on duration 310 may be referred to as an active time, and the time during which the UE 120 is configured to be in the DRX sleep state 315 may be referred to as an inactive time. As described below, the UE 120 may monitor a PDCCH during the active time and may refrain from monitoring the PDCCH during the inactive time.

During the DRX on duration 310 (e.g., the active time), the UE 120 may monitor a downlink control channel (e.g., a PDCCH), as shown by reference number 320. For example, the UE 120 may monitor the PDCCH for downlink control information (DCI) pertaining to the UE 120. If the UE 120 does not detect and/or successfully decode any PDCCH communications intended for the UE 120 during the DRX on duration 310, then the UE 120 may enter the sleep state 315 (e.g., for the inactive time) at the end of the DRX on duration 310, as shown by reference number 325. In this way, the UE 120 may conserve battery power and reduce power consumption. As shown, the DRX cycle 305 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 330 (e.g., which may extend the active time). The UE 120 may start the DRX inactivity timer 330 at a time at which the PDCCH communication is received (e.g., in a transmission time interval (TTI) in which the PDCCH communication is received, such as a slot or a subframe). The UE 120 may remain in the active state until the DRX inactivity timer 330 expires, at which time the UE 120 may enter the sleep state 315 (e.g., for the inactive time), as shown by reference number 335. During the duration of the DRX inactivity timer 330, the UE 120 may continue to monitor for PDCCH communications, may obtain a downlink data communication (e.g., on a downlink data channel, such as a physical downlink shared channel (PDSCH)) scheduled by the PDCCH communication, and/or may prepare and/or transmit an uplink communication (e.g., on a physical uplink shared channel (PUSCH)) scheduled by the PDCCH communication. The UE 120 may restart the DRX inactivity timer 330 after each detection of a PDCCH communication for the UE 120 for an initial transmission (e.g., but not for a retransmission). By operating in this manner, the UE 120 may conserve battery power and reduce power consumption by entering the sleep state 315.

A longer DRX cycle 305 may increase battery power savings but may also increase latency. The base station 110 is unable to forward downlink data to the UE 120 while the UE 120 is in the sleep state 315. Rather, the base station 110 waits for the UE 120 be in the active state before allocating resources and forwarding downlink data.

In some cases, the transfer of uplink data may not be delayed by the DRX cycle 305 because the UE 120 is permitted to interrupt the sleep state 315 to send an SR. However, the base station 110 may align timing of the SR period with the timing of the DRX cycle 305, meaning that the UE 120 could in some cases be restricted to sending SRs only when the UE 120 is in the active state (or just prior to being in the active state). In this case, the UE 120 and the base station 110 have similar average waiting periods when there is a requirement to transfer data. The base station 110 may provide the UE 120 with a configuration that provides the UE 120 with parameters used for the operation of CDRX. The CDRX parameters may include the DRX inactivity timer 330 and a DRX on duration timer, among other examples.

The delay or wait time associated with the UE 120 being in the sleep state 315 may increase latency associated with communicating the data. The average delay or wait time may increase for DRX cycles 305 with smaller DRX inactivity timers 330 (which may allow the UE 120 to enter the sleep state 315 sooner relative to a larger DRX inactivity timer 330). Further, the delay, and therefore the latency, may be greater for data received by the base station 110 shortly after the UE 120 enters the sleep state 315 (e.g., within 10 ms after the UE 120 enters the sleep state 315) relative to data received by the base station 110 at a later time during the sleep state 315 (e.g., greater than 10 ms after the UE 120 enters the sleep state 315).

Commonly, relatively large DRX inactivity timers have been used to reduce latency associated with delay associated with waiting until the next on duration 310 to transmit data to the UE 120 when the UE 120 is in the sleep state 315, and to avoid using DRX prematurely (e.g., when a threshold quantity of data to be transmitted to the UE 120 is expected to be received by the base station 110 during a next time period). However, utilizing the relatively large DRX inactivity timers reduces the quantity of times the UE 120 is able to enter the sleep state 315 and/or reduces the amount of time the UE 120 is able to remain in the sleep state 315, which may decrease an amount of battery power that may be conserved by the UE 120 relative to using a smaller DRX inactivity timer.

Some techniques and apparatuses described herein enable a UE to increase the use of DRX while controlling a maximum amount of latency introduced by the increased usage of DRX. In some aspects, the UE may be configured with a set of conditions that, when satisfied, allow the UE to transition to a sleep state prior to an expiration of a DRX inactivity timer. The set of conditions may control a maximum latency introduced by the UE transitioning to the sleep state prior to the expiration of the DRX inactivity timer and may prevent the UE from transitioning to the sleep state prior to the expiration of the DRX inactivity timer during periods associated with a high scheduling rate (e.g., during periods in which a scheduling rate associated with scheduling resources for the UE satisfies a threshold).

As indicated above, FIG. 3 is provided as an example. Other examples may differ from what is described with respect to FIG. 3.

Figure 4:
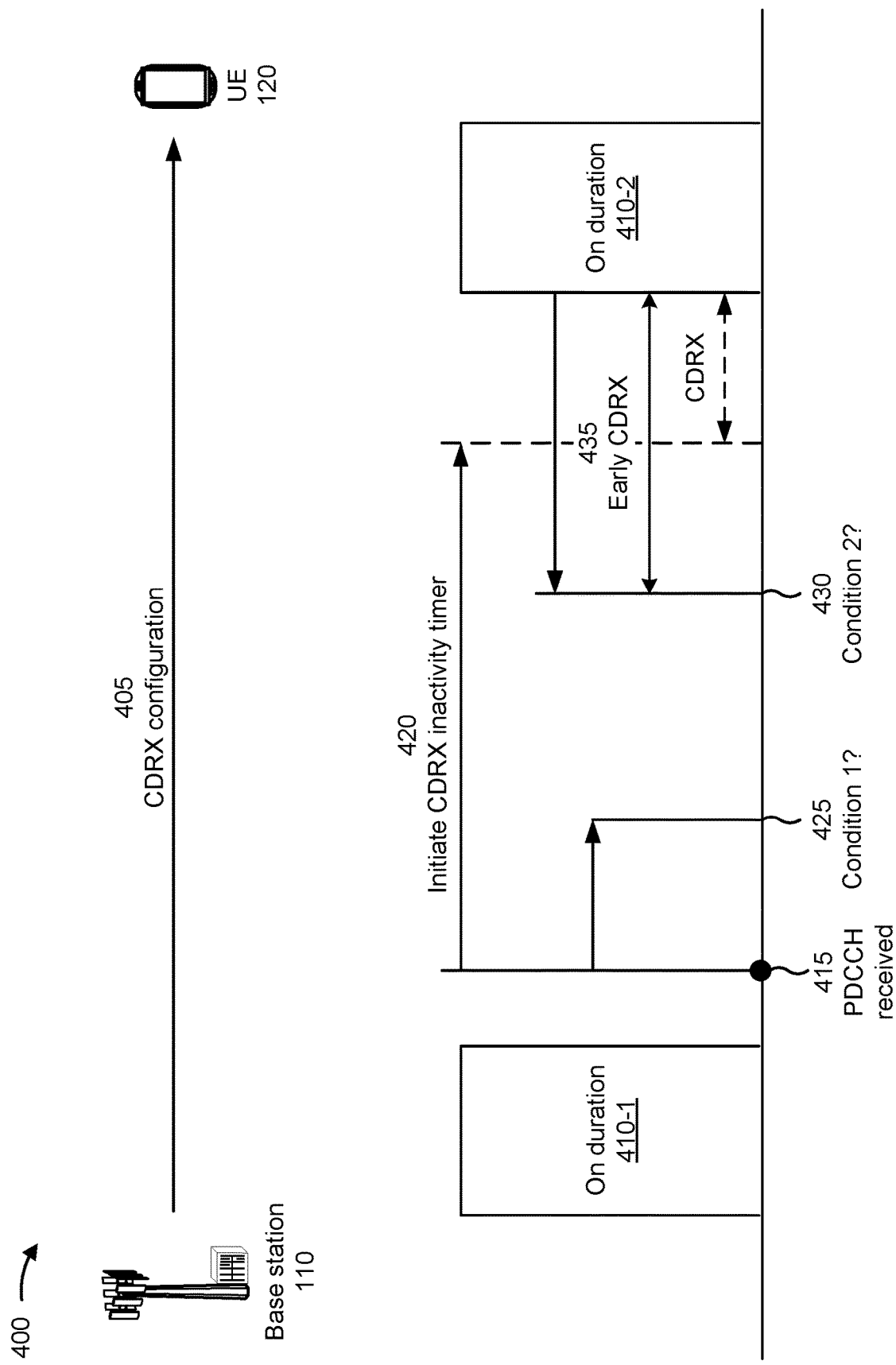
FIG. 4 is a diagram illustrating an example associated with early connected discontinuous reception (CDRX), in accordance with the present disclosure.

FIG. 4 is a diagram illustrating an example 400 associated with early CDRX, in accordance with the present disclosure. As shown in FIG. 4, example 400 includes communication between a base station 110 and a UE 120. In some aspects, the base station 110 and UE 120 may be included in a wireless network, such as wireless network 100. The base station 110 and UE 120 may communicate via a wireless access link, which may include an uplink and a downlink.

As shown by reference number 405, the base station 110 may transmit a CDRX configuration to the UE 120 to configure a CDRX cycle for the UE 120. The CDRX cycle may include an on duration (e.g., on duration 410-1, 410-2, as shown) and an opportunity to enter a sleep state, as described elsewhere herein.

In some aspects, the configuration may indicate a set of CDRX parameters associated with the CDRX cycle. For example, the configuration may indicate a duration of a CDRX inactivity timer (e.g., an amount of time, such as 100 ms or a quantity of slots or sub-slots); a duration of a CDRX on duration timer; and/or a duration, length, or periodicity of the CDRX cycle.

In some aspects, the configuration may indicate a set of early CDRX parameters associated with a set of conditions. The set of conditions, when satisfied, may allow the UE 120 to enter the sleep state prior to the expiration of the inactivity timer, as described in greater detail elsewhere herein.

In some aspects, the set of early CDRX parameters includes a first parameter associated with a first condition. In some aspects, the first parameter may indicate a duration of an early CDRX inactivity timer. For example, the first parameter may indicate an amount of time (e.g., 10 ms) or a quantity of slots (e.g., 20 slots) or sub-slots. In some aspects, the duration of the early CDRX inactivity timer may be less than a duration of the CDRX inactivity timer. The first condition may be satisfied when there is inactivity at the UE 120 for at least the amount of time or the quantity of slots or sub-slots indicated by the first parameter.

In some aspects, the set of early CDRX parameters includes a second parameter associated with a second condition. In some aspects, the second parameter may indicate a duration prior to a start of a next on duration of the CDRX cycle. For example, the second parameter may indicate an amount of time (e.g., 40 ms) or a quantity of slots or sub-slots (e.g., 80 slots or sub-slots) prior to the start of a next on duration of the CDRX cycle. The second condition may be satisfied when a current TTI is less than the time duration indicated by the second parameter from the start of the next on duration of the CDRX cycle.

As an example, the second parameter may have a value indicating a maximum time difference between a current TTI and a time location of a next on duration of the CDRX cycle. For example, the second parameter may have a value of 40 ms. The UE 120 may calculate a difference between a current TTI and a time location of a next on duration of the CDRX cycle. For example, the UE 120 may calculate a difference between a current TTI and a time location of a next on duration of the CDRX cycle as being 30 ms. The UE 120 may determine that the second condition is satisfied when the time difference between the current TTI and the time location of the next on duration of the CDRX cycle is less than the value of the second parameter. For example, the UE 120 may determine that the second condition is satisfied based at least in part on 30 ms (e.g., the time difference between the current TTI and the time location of the next on duration of the CDRX cycle) being less than 40 ms (e.g., the value of the second parameter).

In some aspects, the set of conditions may indicate that the UE 120 may enter the sleep state early only when every condition (e.g., the first condition and the second condition) is satisfied. In this way, the set of CDRX parameters may enable the UE 120 to enter the sleep state early (e.g., prior to the expiration of the CDRX inactivity timer) while preventing the UE 120 from entering the sleep state when a scheduling rate satisfies a threshold based at least in part on the satisfaction of the first condition. Further, the set of CDRX parameters may control a maximum latency introduced by the UE 120 entering the sleep state early based at least in part on the satisfaction of the second condition.

In some aspects, as shown by reference number 415, the UE 120 may detect and/or successfully decode a PDCCH communication intended for the UE 120. For example, the UE 120 may receive DCI scheduling the PDCCH during the on duration 410-1. The UE 120 may remain in the active state to receive the scheduled PDCCH.

As shown by reference number 420, the UE 120 may initiate the CDRX inactivity timer based at least in part on receiving the PDCCH. For example, the UE 120 may start the CDRX inactivity timer at a time at which the PDCCH communication is received (e.g., in a TTI in which the PDCCH communication is received, such as a slot or a subframe). The UE 120 may remain in the active state until every condition included in the set of conditions (e.g., the first condition and the second condition) is satisfied (or until the CDRX inactivity timer expires), as described in greater detail elsewhere herein.

During the duration of the CDRX inactivity timer and prior to every condition included in the set of conditions being satisfied, the UE 120 may continue to monitor for PDCCH communications, may obtain a downlink data communication (e.g., on a downlink data channel, such as a PDSCH) scheduled by the PDCCH communication, and/or may prepare and/or transmit an uplink communication (e.g., on a PUSCH) scheduled by the PDCCH communication. The UE 120 may restart the CDRX inactivity timer after each detection of a PDCCH communication for the UE 120 for an initial transmission (e.g., but not for a retransmission).

As shown by reference number 425, the UE 120 may determine whether the first condition is satisfied based at least in part on initiating the CDRX inactivity timer. For example, a value of the CDRX inactivity timer may be incremented at every TTI. At every TTI, the UE 120 may determine whether the incremented value of the CDRX inactivity timer is greater than the value of the first parameter. The UE 120 may determine that the first condition is satisfied when the incremented value of the CDRX inactivity timer is greater than the value of the first parameter.

In some aspects, the value of the first parameter may be zero. The UE 120 may determine that the first condition is always satisfied based at least in part on the value of the first parameter being zero.

As shown by reference number 430, the UE 120 may determine whether the second condition is satisfied. In some aspects, at every TTI, the UE 120 may calculate a time difference (e.g., an amount of time or a quantity of slots or sub-slots) between the current TTI and a time occurrence of a next on duration. The UE 120 may determine that the second condition is satisfied when the time difference is less than the value of the second parameter.

In some aspects, the value of the second parameter may be zero. The UE 120 may determine that the second condition is never satisfied (e.g., that early CDRX is not configured for the UE 120) based at least in part on the value of the second parameter being zero.

In some aspects, the value of the second parameter may be greater than a duration of the CDRX cycle. The UE 120 may determine that the second condition is always satisfied based at least in part on the value of the second parameter being greater than the duration of the CDRX cycle.

In some aspects, the UE 120 may determine whether the second condition is satisfied based at least in part on the first condition being satisfied. In some aspects, the UE 120 may determine whether the second condition is satisfied concurrently with determining whether the first condition is satisfied. In some aspects, the UE 120 may determine whether the second condition is satisfied prior to determining whether the first condition is satisfied (e.g., the UE 120 may determine whether the first condition is satisfied based at least in part on the second condition being satisfied).

As shown by reference number reference number 435, the UE 120 may enter early CDRX (e.g., the UE 120 may transition from the active state to the sleep state) based at least in part on the first condition and the second condition being satisfied. As shown in FIG. 4, the UE 120 may enter early CDRX prior to the expiration of the CDRX inactivity timer which may enable the UE 120 to remain in the sleep state for a longer duration relative to a sleep state associated with entering CDRX upon expiration of the CDRX inactivity timer.

In some aspects, the UE 120 may enter a short CDRX cycle. For example, the configuration may indicate that the UE 120 is to enter the short CDRX cycle until expiration of a CDRX short cycle timer. Upon expiration of the CDRX short cycle timer, the UE 120 may enter a long CDRX cycle. The short CDRX cycle and the long CDRX cycle may both be similar to the CDRX cycle described above with respect to FIG. 3 except that a duration of the short CDRX cycle may be less than a duration of the long CDRX cycle. For example, a duration of the CDRX (e.g., a duration of time the UE 120 is in the sleep state) of the long CDRX cycle may be greater than a duration of the CDRX of the short CDRX cycle.

In some aspects, the CDRX inactivity timer may continue to run based at least in part on the UE 120 entering the short CDRX cycle. In some aspects, the CDRX short cycle timer may expire prior to the expiration of the CDRX inactivity timer. The UE 120 may reset the CDRX short cycle timer based at least in part on the CDRX short cycle timer expiring prior to the expiration of the CDRX inactivity timer.

In some aspects, the UE 120 may initiate the CDRX short cycle timer based at least in part on an expiration of the CDRX inactivity timer. The UE 120 may reset the CDRX short cycle timer (e.g., when the CDRX short cycle timer expires prior to the expiration of the CDRX inactivity timer) or may initiate the CDRX short cycle timer based at least in part on the expiration of the CDRX inactivity timer to prevent the UE 120 from entering the long CDRX cycle prior to the expiration of the CDRX inactivity timer.

In some aspects, the UE 120 may transition to the long CDRX cycle based at least in part on the first condition and the second condition being satisfied. For example, the UE 120 may not be configured to utilize the short CDRX cycle.

In some aspects, the UE 120 may monitor one or more wake up slots during the duration of the early CDRX. For example, the configuration may indicate a wake up slot preceding an on duration associated with the UE 120 entering the early CDRX. The UE 120 may transition from the sleep state to the active state to monitor the wake up slot. In some aspects, the UE 120 may receive an indication to skip monitoring the next on duration based at least in part on monitoring the wake up slot. The UE 120 may skip monitoring the next on duration (e.g., the UE 120 may remain in the sleep state during the next on duration) based at least in part on the indication.

As indicated above, FIG. 4 is provided as an example. Other examples may differ from what is described with respect to FIG. 4.

Figure 5:
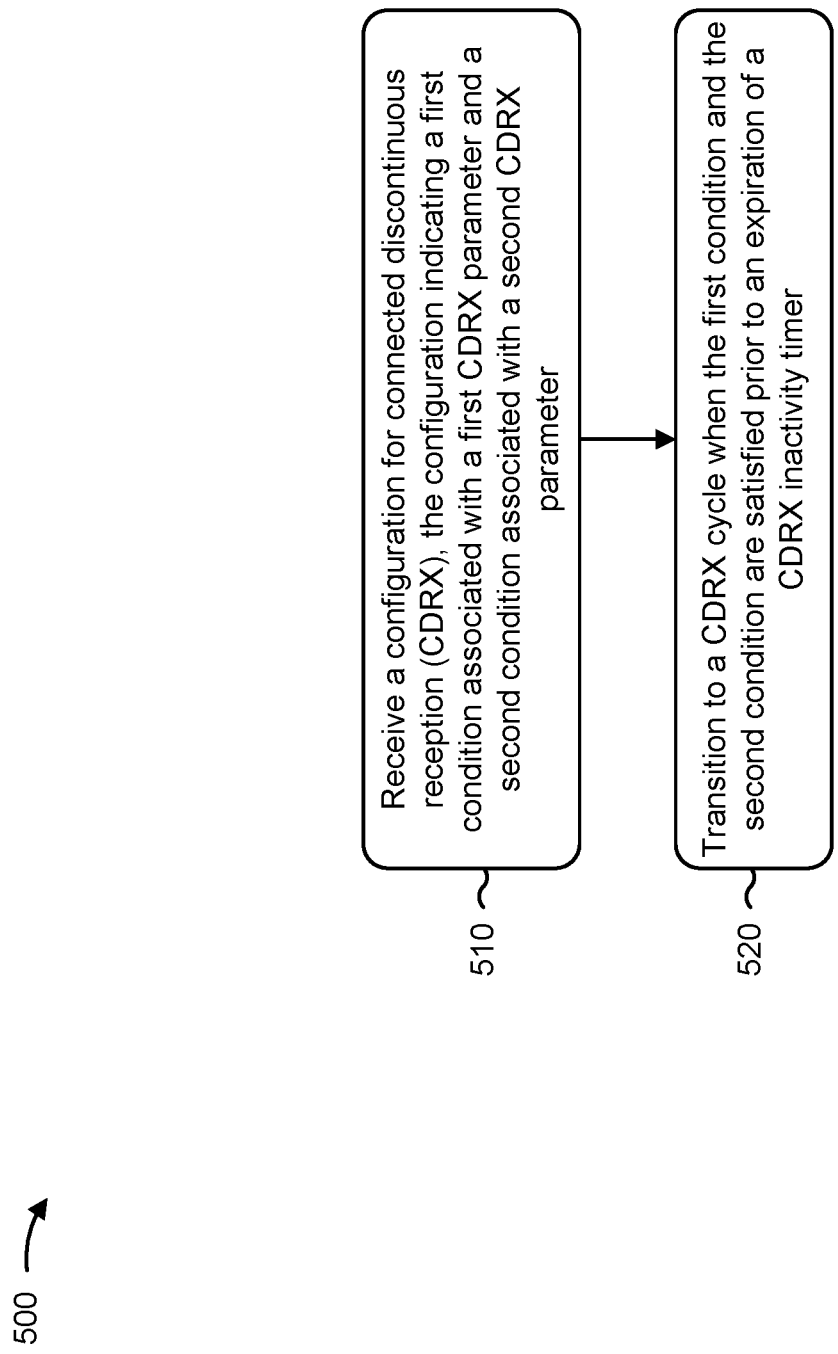
FIG. 5 is a diagram illustrating an example process associated with early CDRX, in accordance with the present disclosure.

FIG. 5 is a diagram illustrating an example process 500 performed, for example, by a UE, in accordance with the present disclosure. Example process 500 is an example where the UE (e.g., UE 120) performs operations associated with early CDRX.

As shown in FIG. 5, in some aspects, process 500 may include receiving a configuration for CDRX, the configuration indicating a first condition associated with a first CDRX parameter and a second condition associated with a second CDRX parameter (block 510). For example, the UE (e.g., using communication manager 140 and/or reception component 602, depicted in FIG. 6) may receive a configuration for CDRX, the configuration indicating a first condition associated with a first CDRX parameter and a second condition associated with a second CDRX parameter, as described above.

As further shown in FIG. 5, in some aspects, process 500 may include transitioning to a CDRX cycle when the first condition and the second condition are satisfied prior to an expiration of a CDRX inactivity timer (block 520). For example, the UE (e.g., using communication manager 140 and/or transition component 608, depicted in FIG. 6) may transition to a CDRX cycle when the first condition and the second condition are satisfied prior to an expiration of a CDRX inactivity timer, as described above.

Process 500 may include additional aspects, such as any single aspect or any combination of aspects described below and/or in connection with one or more other processes described elsewhere herein.

In a first aspect, the first CDRX parameter indicates a first quantity of slots, and wherein the first condition is satisfied when there is inactivity at the UE for at least the first quantity of slots.

In a second aspect, alone or in combination with the first aspect, the second CDRX parameter indicates a second quantity of slots, and wherein the second condition is satisfied when a current slot is less than the second quantity of slots prior to a start of a next CDRX on duration.

In a third aspect, alone or in combination with one or more of the first and second aspects, the second CDRX parameter indicates a maximum time difference, the method further comprising calculating a time difference between a current TTI and a time location of a next on duration of the CDRX cycle, wherein the second condition is satisfied when the time difference is less than the maximum time difference.

In a fourth aspect, alone or in combination with one or more of the first through third aspects, the second condition is satisfied when a current value of the CDRX inactivity timer is greater than a value of the second CDRX parameter.

In a fifth aspect, alone or in combination with one or more of the first through fourth aspects, the first CDRX parameter is configured to control a maximum latency associated with the CDRX cycle and the second CDRX parameter is configured to prevent the UE from transitioning to the CDRX cycle when a scheduling rate satisfies a scheduling rate threshold.

In a sixth aspect, alone or in combination with one or more of the first through fifth aspects, after transitioning to the CDRX cycle, the UE monitors one or more wake up slots indicated in the configuration.

In a seventh aspect, alone or in combination with one or more of the first through sixth aspects, the one or more wake up slots are prior to an on duration associated with the UE transitioning to the CDRX cycle when the first condition and the second condition are satisfied prior to the expiration of the CDRX inactivity timer.

In an eighth aspect, alone or in combination with one or more of the first through seventh aspects, the UE transitions to a short CDRX cycle when the first condition and the second condition are satisfied prior to the expiration of the CDRX inactivity timer, and wherein the CDRX inactivity timer continues to run based at least in part on the UE transitioning to the short CDRX cycle.

In a ninth aspect, alone or in combination with one or more of the first through eighth aspects, a CDRX short cycle timer is initiated based at least in part on an expiration of the CDRX inactivity timer.

In a tenth aspect, alone or in combination with one or more of the first through ninth aspects, the UE transitions to a long CDRX cycle when the first condition and the second condition are satisfied prior to the expiration of the CDRX inactivity timer.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
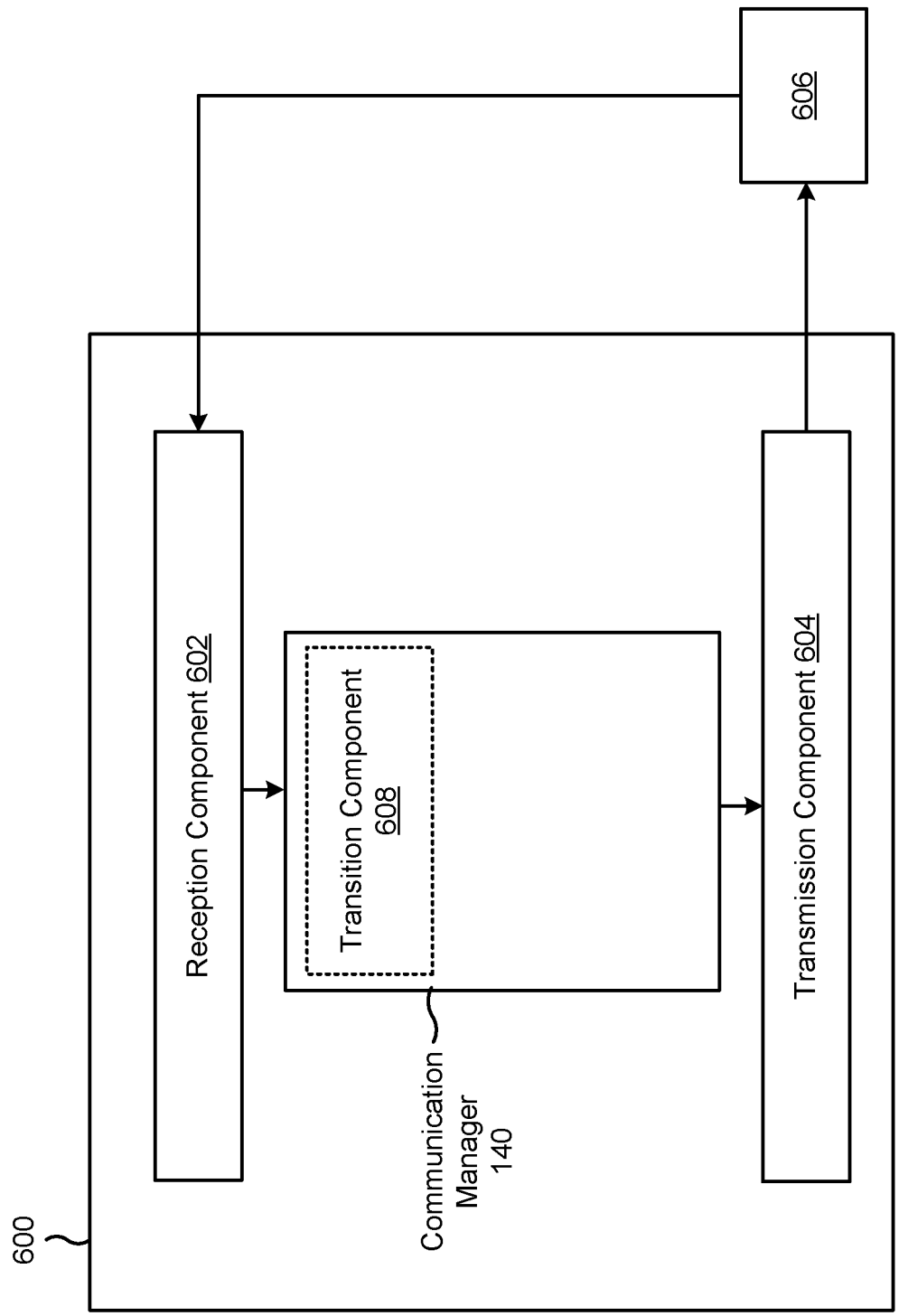
FIG. 6 is a diagram of an example apparatus for wireless communication, in accordance with the present disclosure.

FIG. 6 is a diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include a transition component 608, among other examples.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The reception component 602 may receive a configuration for CDRX, the configuration indicating a first condition associated with a first CDRX parameter and a second condition associated with a second CDRX parameter. The transition component 608 may transition to a CDRX cycle when the first condition and the second condition are satisfied prior to an expiration of a CDRX inactivity timer.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a UE, comprising: receiving a configuration for CDRX, the configuration indicating a first condition associated with a first CDRX parameter and a second condition associated with a second CDRX parameter; and transitioning to a CDRX cycle when the first condition and the second condition are satisfied prior to an expiration of a CDRX inactivity timer.

Aspect 2: The method of Aspect 1, wherein the first CDRX parameter indicates a first quantity of slots, and wherein the first condition is satisfied when there is inactivity at the UE for at least the first quantity of slots.

Aspect 3: The method of one or more of Aspects 1 and 2, wherein the second CDRX parameter indicates a second quantity of slots, and wherein the second condition is satisfied when a current slot is less than the second quantity of slots prior to a start of a next CDRX on duration.

Aspect 4: The method of one or more of Aspects 1 through 3, wherein the second CDRX parameter indicates a maximum time difference, the method further comprising: calculating a time difference between a current TTI and a time location of a next on duration of the CDRX cycle, wherein the second condition is satisfied when the time difference is less than the maximum time difference.

Aspect 5: The method of one or more of Aspects 1 through 4, wherein the second condition is satisfied when a current value of the CDRX inactivity timer is greater than a value of the second CDRX parameter.

Aspect 6: The method of one or more of Aspects 1 through 5, wherein the first CDRX parameter is configured to control a maximum latency associated with the CDRX cycle and the second CDRX parameter is configured to prevent the UE from transitioning to the CDRX cycle when a scheduling rate satisfies a scheduling rate threshold.

Aspect 7: The method of one or more of Aspects 1 through 6, wherein after transitioning to the CDRX cycle, the UE monitors one or more wake up slots indicated in the configuration.

Aspect 8: The method of Aspect 7, wherein the one or more wake up slots are prior to an on duration associated with the UE transitioning to the CDRX cycle when the first condition and the second condition are satisfied prior to the expiration of the CDRX inactivity timer.

Aspect 9: The method of one or more of Aspects 1 through 8, wherein the UE transitions to a short CDRX cycle when the first condition and the second condition are satisfied prior to the expiration of the CDRX inactivity timer, and wherein the CDRX inactivity timer continues to run based at least in part on the UE transitioning to the short CDRX cycle.

Aspect 10: The method of Aspect 9, wherein a CDRX short cycle timer is initiated based at least in part on an expiration of the CDRX inactivity timer.

Aspect 11: The method of one or more of Aspects 1 through 10, wherein the UE transitions to a long CDRX cycle when the first condition and the second condition are satisfied prior to the expiration of the CDRX inactivity timer.

Aspect 12: An apparatus for wireless communication at a device, comprising a processor; memory coupled with the processor; and instructions stored in the memory and executable by the processor to cause the apparatus to perform the method of one or more of Aspects 1 through 11.

Aspect 13: A device for wireless communication, comprising a memory and one or more processors coupled to the memory, the one or more processors configured to perform the method of one or more of Aspects 1 through 11.

Aspect 14: An apparatus for wireless communication, comprising at least one means for performing the method of one or more of Aspects 1 through 11.

Aspect 15: A non-transitory computer-readable medium storing code for wireless communication, the code comprising instructions executable by a processor to perform the method of one or more of Aspects 1 through 11.

Aspect 16: A non-transitory computer-readable medium storing a set of instructions for wireless communication, the set of instructions comprising one or more instructions that, when executed by one or more processors of a device, cause the device to perform the method of one or more of Aspects 1 through 11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive a configuration for connected discontinuous reception (CDRX), the configuration indicating a first condition associated with a first CDRX parameter and a second condition associated with a second CDRX parameter; and
        transition to a CDRX cycle when the first condition and the second condition are satisfied prior to an expiration of a CDRX inactivity timer.

2. The UE of claim 1, wherein the first CDRX parameter indicates a first quantity of slots, and wherein the first condition is satisfied when there is inactivity at the UE for at least the first quantity of slots.

3. The UE of claim 1, wherein the second CDRX parameter indicates a second quantity of slots, and wherein the second condition is satisfied when a current slot is less than the second quantity of slots prior to a start of a next CDRX on duration.

4. The UE of claim 1, wherein the second CDRX parameter indicates a maximum time difference, wherein the one or more processors are further configured to:
    calculate a time difference between a current transmission time interval (TTI) and a time location of a next on duration of the CDRX cycle, wherein the second condition is satisfied when the time difference is less than the maximum time difference.

5. The UE of claim 1, wherein the second condition is satisfied when a current value of the CDRX inactivity timer is greater than a value of the second CDRX parameter.

6. The UE of claim 1, wherein the first CDRX parameter is configured to control a maximum latency associated with the CDRX cycle and the second CDRX parameter is configured to prevent the UE from transitioning to the CDRX cycle when a scheduling rate satisfies a scheduling rate threshold.

7. The UE of claim 1, wherein after transitioning to the CDRX cycle, the UE monitors one or more wake up slots indicated in the configuration.

8. The UE of claim 7, wherein the one or more wake up slots are prior to an on duration associated with the UE transitioning to the CDRX cycle when the first condition and the second condition are satisfied prior to the expiration of the CDRX inactivity timer.

9. The UE of claim 1, wherein the UE transitions to a short CDRX cycle when the first condition and the second condition are satisfied prior to the expiration of the CDRX inactivity timer, and wherein the CDRX inactivity timer continues to run based at least in part on the UE transitioning to the short CDRX cycle.

10. The UE of claim 9, wherein a CDRX short cycle timer is initiated based at least in part on an expiration of the CDRX inactivity timer.

11. The UE of claim 1, wherein the UE transitions to a long CDRX cycle when the first condition and the second condition are satisfied prior to the expiration of the CDRX inactivity timer.

12. A method of wireless communication performed by a user equipment (UE), comprising:
receiving a configuration for connected discontinuous reception (CDRX), the configuration indicating a first condition associated with a first CDRX parameter and a second condition associated with a second CDRX parameter; and
transitioning to a CDRX cycle when the first condition and the second condition are satisfied prior to an expiration of a CDRX inactivity timer.

13. The method of claim 12, wherein the first CDRX parameter indicates a first quantity of slots, and wherein the first condition is satisfied when there is inactivity at the UE for at least the first quantity of slots.

14. The method of claim 12, wherein the second CDRX parameter indicates a maximum time difference, the method further comprising:
calculating a time difference between a current transmission time interval (TTI) and a time location of a next on duration of the CDRX cycle, wherein the second condition is satisfied when the time difference is less than the maximum time difference.

15. The method of claim 12, wherein the first CDRX parameter is configured to control a maximum latency associated with the CDRX cycle and the second CDRX parameter is configured to prevent the UE from transitioning to the CDRX cycle when a scheduling rate satisfies a scheduling rate threshold.

16. The method of claim 12, wherein after transitioning to the CDRX cycle, the UE monitors one or more wake up slots indicated in the configuration, wherein the one or more wake up slots are prior to an on duration associated with the UE transitioning to the CDRX cycle when the first condition and the second condition are satisfied prior to the expiration of the CDRX inactivity timer.

17. The method of claim 12, wherein the UE transitions to a short CDRX cycle when the first condition and the second condition are satisfied prior to the expiration of the CDRX inactivity timer, and wherein the CDRX inactivity timer continues to run based at least in part on the UE transitioning to the short CDRX cycle.

18. The method of claim 17, wherein a CDRX short cycle timer is initiated based at least in part on an expiration of the CDRX inactivity timer.

19. A non-transitory computer-readable medium storing a set of instructions for wireless communication, the set of instructions comprising:
one or more instructions that, when executed by one or more processors of a user equipment (UE), cause the UE to:
receive a configuration for connected discontinuous reception (CDRX), the configuration indicating a first condition associated with a first CDRX parameter and a second condition associated with a second CDRX parameter; and
transition to a CDRX cycle when the first condition and the second condition are satisfied prior to an expiration of a CDRX inactivity timer.

20. The non-transitory computer-readable medium of claim 19, wherein the first CDRX parameter indicates a first quantity of slots, and wherein the first condition is satisfied when there is inactivity at the UE for at least the first quantity of slots.

21. The non-transitory computer-readable medium of claim 19, wherein the second CDRX parameter indicates a maximum time difference, and wherein the one or more instructions further cause the UE to:
calculate a time difference between a current transmission time interval (TTI) and a time location of a next on duration of the CDRX cycle, wherein the second condition is satisfied when the time difference is less than the maximum time difference.

22. The non-transitory computer-readable medium of claim 19, wherein after transitioning to the CDRX cycle, the UE monitors one or more wake up slots indicated in the configuration, wherein the one or more wake up slots are prior to an on duration associated with the UE transitioning to the CDRX cycle when the first condition and the second condition are satisfied prior to the expiration of the CDRX inactivity timer.

23. The non-transitory computer-readable medium of claim 19, wherein the UE transitions to a short CDRX cycle when the first condition and the second condition are satisfied prior to the expiration of the CDRX inactivity timer, wherein the CDRX inactivity timer continues to run based at least in part on the UE transitioning to the short CDRX cycle, and wherein a CDRX short cycle timer is initiated based at least in part on an expiration of the CDRX inactivity timer.

24. An apparatus for wireless communication, comprising:
means for receiving a configuration for connected discontinuous reception (CDRX), the configuration indicating a first condition associated with a first CDRX parameter and a second condition associated with a second CDRX parameter; and
means for transitioning to a CDRX cycle when the first condition and the second condition are satisfied prior to an expiration of a CDRX inactivity timer.

25. The apparatus of claim 24, wherein the first CDRX parameter indicates a first quantity of slots, and wherein the first condition is satisfied when there is inactivity at the apparatus for at least the first quantity of slots.

26. The apparatus of claim 24, wherein the second CDRX parameter indicates a second quantity of slots, and wherein the second condition is satisfied when a current slot is less than the second quantity of slots prior to a start of a next CDRX on duration.

27. The apparatus of claim 24, wherein the second CDRX parameter indicates a maximum time difference, the apparatus further comprising:
means for calculating a time difference between a current transmission time interval (TTI) and a time location of a next on duration of the CDRX cycle, wherein the second condition is satisfied when the time difference is less than the maximum time difference.

28. The apparatus of claim 24, wherein the first CDRX parameter is configured to control a maximum latency associated with the CDRX cycle and the second CDRX parameter is configured to prevent the apparatus from transitioning to the CDRX cycle when a scheduling rate satisfies a scheduling rate threshold.

29. The apparatus of claim 24, wherein after transitioning to the CDRX cycle, the apparatus monitors one or more wake up slots indicated in the configuration, wherein the one or more wake up slots are prior to an on duration associated with the apparatus transitioning to the CDRX cycle when the first condition and the second condition are satisfied prior to the expiration of the CDRX inactivity timer.

30. The apparatus of claim 24, wherein the apparatus transitions to a short CDRX cycle when the first condition and the second condition are satisfied prior to the expiration of the CDRX inactivity timer, wherein the CDRX inactivity timer continues to run based at least in part on the apparatus transitioning to the short CDRX cycle, and wherein a CDRX short cycle timer is initiated based at least in part on an expiration of the CDRX inactivity timer.

\* \* \* \* \*